United States Patent

Cameron

[15] 3,680,191
[45] Aug. 1, 1972

[54] SEAL RING PICK-UP SUPPORT

[72] Inventor: Alistair A. Cameron, Welland, Ontario, Canada

[73] Assignee: General Motors Corporation, Detroit, Mich.

[22] Filed: Aug. 3, 1970

[21] Appl. No.: 60,262

[52] U.S. Cl. ................................................29/235
[51] Int. Cl. ............................................B23p 19/02
[58] Field of Search ..29/235, 229, 280, 282; 269/47, 269/49-52

[56] References Cited

UNITED STATES PATENTS 3,177,566  4/1965  Hester........................29/235 X
3,487,529  1/1970  Serio.............................29/235

*Primary Examiner*—Andrew R. Juhasz
*Assistant Examiner*—Michael Koczo, Jr.
*Attorney*—J. L. Carpenter and Robert J. Outland

[57] ABSTRACT

In preferred form, an O-ring seal installing machine is provided with an expanding segment support member which receives and supports individual seal rings on a surface from which they are picked up by a plunger device. The support member is segmented and spring biased to provide for limited expansion during insertion of the plunger so as to obtain positive pick-up of the seal rings without cutting or damaging them.

2 Claims, 4 Drawing Figures

PATENTED AUG 1 1972 3,680,191

INVENTOR.
Alistair A. Cameron
BY
Robert J. Outland
ATTORNEY

SEAL RING PICK-UP SUPPORT

BACKGROUND OF THE INVENTION

This invention relates to production machinery and, in particular, to devices for supporting seal rings, such as rubber O-rings and the like, so that they may be picked up without damage by a plunger member as part of an assembly step.

Many uses have been made of annular seal rings, such as rubber O-ring seals and the like, wherein the seals are required to be installed on a short or rod-like member — for example, an internal combustion engine valve stem. In the provision of automatic machinery for making repetetive installations of such O-ring seals, it may be desirable to use a support member which is capable of providing a supporting surface for an O-ring and permitting the insertion of a rod-like member within the O-ring for installation thereon. Such a device may be used for direct installation of an O-ring on any desired component, but is preferably utilized in the seating of such O-rings upon the resiliently carried plunger of a quill shaft member which, in a subsequent step, is made to install the O-ring on the final part, such as the engine valve stem.

SUMMARY OF THE INVENTION

The present invention provides a seal ring pick-up support which may be used in conjunction with O-ring seal installation machinery to provide a support member for pick-up of the seal ring by a quill shaft or the like. The collar assembly is formed of long-wearing steel parts and includes a segmented support member. A light tension spring is utilized to normally hold the support member segments together to provide a proper seat for the O-ring and to yield to permit entry of the quill shaft plunger into the O-ring and support member opening, without undesirable compression of the plunger spring. Thus, there is provided a firm seat for the O-ring, which closely engages the quill shaft plunger so that there is no tendency to cut or deform the O-ring into any clearance space during the pick-up operation.

These and other advantages of the invention will be more apparent from the following description of a preferred embodiment taken together with the accompanying drawing.

DESCRIPTION OF THE PREFERRED EMBODIMENT

Figure 3:
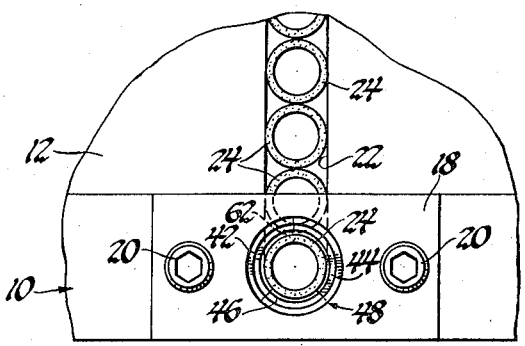
FIG. 3 is a plan view of a portion of the machine of FIG. 1 taken in the plane indicated by the line 3—3 as viewed in the direction of the arrows.

Referring in detail to the drawing, numeral 10 generally indicates a seal assembly machine adapted for the automatic assembly of O-ring seals onto the stems of the poppet valves of internal combustion engines. Machine 10 includes a table 12 having an opening 14 in which is received a pick-up support assembly 16 formed according to the present invention. Support assembly 16 is prevented from rotation by a set screw 17 and is retained in the opening 14 by a retainer plate 18 secured to the table by cap screws 20.

A feed groove 22 is provided along the upper surface of the table through which a plurality of O-rings 24 may be supplied to the support assembly by feed means, not shown.

Above the support assembly is a quill shaft 26 which is vertically reciprocable through mechanism, not shown, and carries a cylindrical plunger 28 with a tapered end 29 and an internal guide rod 30 with a tapered end 31. Both the plunger 28 and guide rod 30 are spring loaded so as to be retractable within the quill shaft upon the application of sufficient force, as is required in the subsequent step of transferring O-rings picked up by the quill shaft onto the engine valve stems. Details of this aspect of the structure are not disclosed, since they form no part of the present invention.

The pick-up support assembly 16 of the present invention comprises a cylindrical base member 32 having a central opening 34 and an upper end surface 36. The upper end surface is broken by three radially extending grooves in which are retained keys 38.

Seated on surface 36 are the lower end surfaces 40 of three individual segments 42, 44, 46 which make up a segmented support member generally indicated by numeral 48. Radially extending keyways 50 are provided on the lower ends of each of the segments 42, 44, 46 and engage the keys 38 so that the segments are movable on surface 36 only in radially inward and outward directions. An annular groove 52 extends around the support member, portions of the groove being in each of the three segments. A coil-type tension spring 54 is received in groove 52 so as to bias the three segments of the support member 48 into circumferential engagement of their opposing end surfaces 56.

Adjacent its upper end, the segmented support member provides a seal-supporting surface 58, which is partially surrounded by a lip 60 but is open along one side 62, which is aligned with feed groove 22 in order to provide for the delivery of seal rings onto the supporting surface 58. A central opening 64 is defined by the segments 42, 44, 46 and extends centrally of the support member 48 for a purpose to be subsequently described.

In operation, the feed mechanism, not shown, urges O-rings 24 through groove 22 and onto surface 58 of the segmented support member 48. The seal members engage lip 60 and are thereby guided to an approximately centered position over the central opening 64. Upon the downstroke of quill shaft 26 by mechanism, not disclosed, the tapered end 31 of guide rod 30 first enters the annular seal ring, positively centering it.

Upon further downward movement, the guide rod 30 is inserted into opening 64 and, since it is slightly larger than the opening, it causes the three segments 42, 44, 46 to move outward slightly in radial directions as guided by keys 38 so as to admit the guide rod into the opening. It is important that the tension on spring 54 be sufficiently light to permit the guide rod to enter opening 64 without compressing the springs which bias it and the plunger member 28 so that the O-ring will be properly installed on the plunger.

Figure 1:
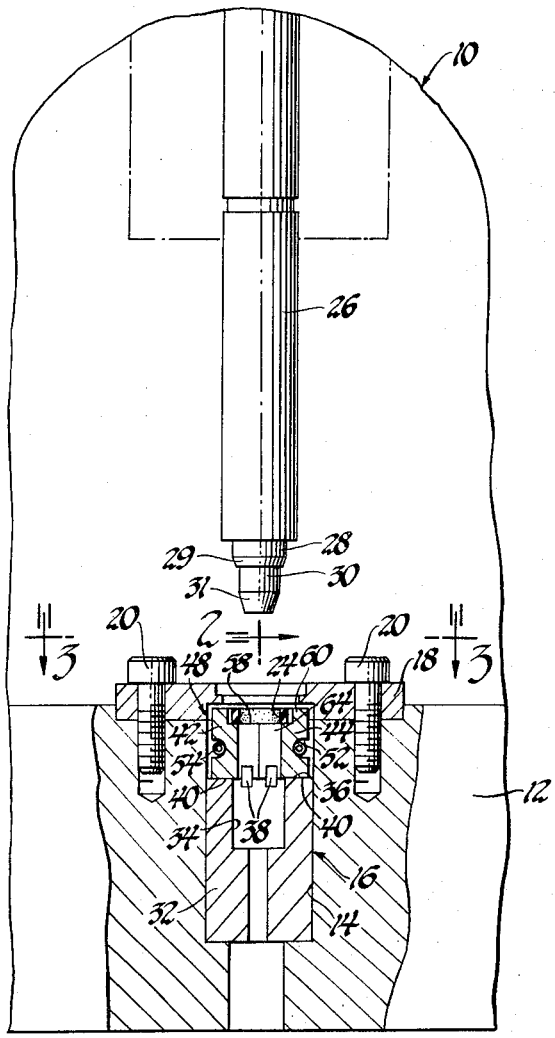
FIG. 1 is an elevational view partially in section and showing the pertinent portions of an engine valve O-ring seal installation machine in which is utilized a seal ring pick-up support made according to the invention.
Figure 4:
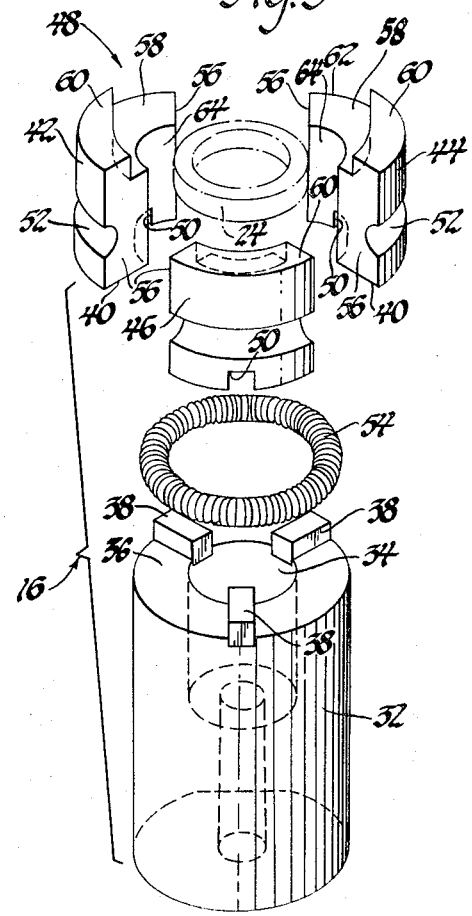
FIG. 4 is an exploded pictorial view illustrating the components of the seal ring pick-up support utilized in the machine of FIGS. 1 - 3.
Figure 2:
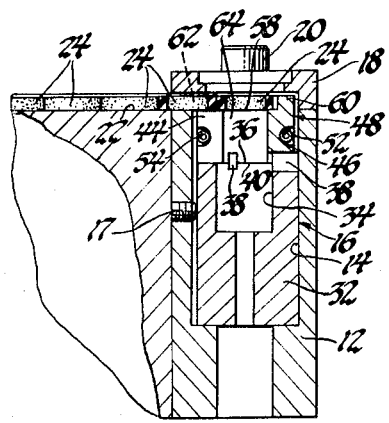
FIG. 2 is a cross-sectional view taken in the plane indicated by the line 2—2 of FIG. 1 as viewed in the direction of the arrows.

Upon further downward movement, the lower edge of plunger 28 is inserted inside the O-ring 24, which slides up on the plunger and is retained thereon. The quill shaft is then retracted upwardly out of the support member, the segments being returned to their initial contacting positions by the tension spring 54. At this point the feed mechanism moves another seal ring into position on the surface 58. After a further step, in which the seal ring on quill shaft 26 is installed on an engine valve stem, the quill shaft returns to the position shown in FIG. 1 and is ready to repeat the cycle.

It should be apparent that the segmented support member 48 firmly supports each seal during the pick-up process, leaving no clearance between the quill shaft plunger and the support member into which the seal may be extruded or deformed. The use of key-guided segments maintains proper alignment of the support member opening 64 with the quill shaft plunger. The coil spring 54 must be strong enough to maintain normal engagement of the segments, but light enough to allow them to move outwardly upon entry of the guide rod 30 into the opening 64, without compressing the springs of the guide rod 30 and plunger 28. The present arrangement provides these advantages with a structure formed of long-wearing steel components which give extended life and positive action.

While the invention has been disclosed by reference to a preferred embodiment, it should be apparent that numerous modifications could be made within the scope of the disclosure; accordingly, the invention should not be limited except by the language of the following claims.

I claim:

1. A seal ring pick-up support for use in combination with a machine for installing resilient annular seal rings on cylindrical shaft-like members, said support comprising
    a base member adapted to be carried by said machine and having an end surface with a central cylindrical opening extending through said end surface,
    a segmented support member including at least three separate segments having opposing radial surfaces adapted to be maintained in contact with the respective radial surfaces of the adjoining segments and lower end surfaces slidably received on the end surface of said base member, said support member segments together defining a central opening aligned with said base member opening and an upper seal receiving surface surrounding said central opening and extending radially to one edge of said support member, with a seal positioning lip extending around three sides of said seal receiving surface to align with said opening a seal ring pushed into said seal receiving surface from the open one of said sides,
    said support member segments being individually keyed to said base member by radially extending keys permitting outward movement of said segments only radially of said central opening and
    resilient means biasing said segments into their central engaged positions.

2. A seal ring pick-up support for use in combination with a seal ring installing machine having a quill shaft with a resiliently carried plunger adapted to pick up seal rings from the support, said support comprising
    a base member adapted to be carried by said machine and having an end surface with a central cylindrical opening extending through said end surface,
    a segmented support member formed of no less than three separate segments adapted to be maintained in circumferential contact and having lower end surfaces slidably received on the end surface of said base member, said segments together defining an upper seal receiving surface partially surrounded by a guide lip, having an opening on one side to permit a seal to be slid onto said seal receiving surface, a quill shaft plunger receiving opening defined by said segments, centrally of and opening through said seal receiving surface, said plunger receiving opening being sized to receive a quill shaft pick-up plunger only when said segments are slightly separated,
    radially extending key means keying each of said segments to said base member for radial inward and outward movement on said end surface, and
    a tension coil spring received in a groove extending around said segments and biasing them inwardly into normally centered positions of circumferential contact so as to provide a near continuous seal ring support surface.

* * * * *